United States Patent [19]

Sakakiyama

[11] Patent Number: 4,494,641
[45] Date of Patent: Jan. 22, 1985

[54] ELECTROMAGNETIC CLUTCH CONTROL SYSTEM FOR AUTOMOBILES

[75] Inventor: Ryuzo Sakakiyama, Tokyo, Japan

[73] Assignee: Fuji Jukogyo Kabushiki Kaisha, Tokyo, Japan

[21] Appl. No.: 322,816

[22] Filed: Nov. 19, 1981

[30] Foreign Application Priority Data

Nov. 19, 1980 [JP] Japan ................. 55-162831

[51] Int. Cl.³ ............................... B60K 41/02
[52] U.S. Cl. ..................... 192/0.076; 192/0.096
[58] Field of Search ............ 192/0.07, 0.075, 0.076, 192/0.096, 3.56; 74/866; 361/240, 241

[56] References Cited

U.S. PATENT DOCUMENTS 4,086,992  5/1978  Hamada ................. 192/0.076

FOREIGN PATENT DOCUMENTS 0860545  2/1961  United Kingdom .
0922044  3/1963  United Kingdom .
1007612  10/1965  United Kingdom .
1028964  5/1966  United Kingdom .

Primary Examiner—George H. Krizmanich
Assistant Examiner—M. Manley
Attorney, Agent, or Firm—Martin A. Farber

[57] ABSTRACT

A system for controlling an electromagnetic clutch of an internal combustion engine mounted on a vehicle, the clutch having a drive member secured to a crankshaft of the internal combustion engine, a driven member adjacent the drive member, and a magnetizing coil provided in one of said members, and a transmission secured to the driven member. A pulse generating circuit is provided for producing output pulses in dependency on the speed of the engine. An idling speed detecting circuit and a correcting circuit are provided for producing a correcting output when the idling engine speed increases which is caused when the choke valve or the air conditioning device of the vehicle is operated. Gate means is responsive to the output of the pulse generating circuit for producing an output which is applied to a switching transistor. The transistor is turned on by the output, so that clutch current passes through the magnetizing coil for engaging the clutch. The correcting output is applied to the pulse generating circuit for decreasing the output pulses upon an increase in the idling speed.

7 Claims, 12 Drawing Figures 4,494,641

ELECTROMAGNETIC CLUTCH CONTROL SYSTEM FOR AUTOMOBILES

BACKGROUND OF THE INVENTION

The present invention relates to a system for controlling an electromagnetic clutch for an internal combustion engine mounted on a vehicle, and more particularly to a system for controlling clutch current to a predetermined value in spite of the variation of the idling speed during idling operation of the engine.

An electromagnetic powder clutch as a type of electromagnetic clutch is known. The electromagnetic powder clutch comprises an annular drive member secured to the crankshaft of an engine, a driven member secured to the input shaft of a transmission and provided adjacent to the drive member spaced therefrom by a small gap, a magnetizing coil provided in one of the members, and magnetic powder provided in a chamber in the clutch. Change speed gears in the transmission are changed by operating a shift lever. The shift lever is provided with a switch for the circuit of the magnetizing coil, when the shift lever is gripped by operator's hand, the switch is opened to cut off the clutch current. Accordingly, the gear changing operation of the transmission may be performed. When the shift lever is shifted to a gear engaging position, and released from the hand, of the operator the switch is closed so that electric current flows through the magnetizing coil to magnetize the member provided with the magnetizing coil. As the accelerator pedal is depressed, the current applied to the coil increases. The magnetic powder is aggregated in the gap between the drive member and the driven member, so that the driven member is coupled to the drive member. The clutch current passing through the magnetizing coil is progressively increased according to the degree of depression of the accelerator pedal, while the clutch slips between the drive member and driven member and gradually engages to full engagement when the clutch current reaches to the rated current. Thus, the vehicle may be started by depressing the accelerator pedal without operating a clutch pedal.

In order to control driving of the vehicle, it is necessary to detect the speed of the vehicle and to control the clutch current according to the speed. In a system to meet such a requirement, a speed sensor is provided to generate a signal when the vehicle speed exceeds a predetermined value. The system is designed such that the clutch slips for providing partial engagement of the clutch during low speed below the predetermined speed and the clutch fully engages when the vehicle speed reaches the predetermined speed. When the vehicle speed decreases to a predetermined low value, the clutch is disengaged so as to prevent the engine from stopping. Generally, the speed sensor is provided in the speedometer operated through a speedometer cable. In a system employing such a speed sensor, there is the disadvantage that when the vehicle is decelerated to a speed below the predetermined speed, the braking action of the engine is not effective because of the disengagement of the clutch. Further, if the speedometer cable is broken, the speed sensor does not work. Therefore, if the speed sensor does not work in a deceleration condition, the circuit of the magnetizing coil of the clutch is interrupted so that the clutch disengages. As a result, the braking action of the engine is not effective.

In order to eliminate such disadvantages, a control system employing a speed detecting means which detects the engine speed from ignition pulses of the engine has been proposed. In accordance with this control system, pulsating current passes through the magnetizing coil of the clutch and the current is controlled in proportion to the ignition pulses for providing the partial engagement of the clutch.

FIG. 11 shows the relationship between the clutch torque and the engine speed in the conventional system. In a normal engine operation, the clutch torque varies as shown by a curve C. When the accelerator pedal is depressed, the vehicle starts with a torque A at the corresponding speed in the idling operation. If the choke valve of the engine is closed or an air conditioning device of the vehicle is operated, the engine speed is increased and the clutch torque for starting the vehicle is increased to B on the curve D at the corresponding idling speed. Accordingly, the vehicle starts abruptly by the high clutch torque and cannot drive at a very low speed.

SUMMARY OF THE INVENTION

The object of the present invention is to provide a clutch current control system which may smoothly start the vehicle and drive it at a very low speed.

In accordance with the system, the clutch torque is adjusted to a predetermined value upon a variation of the engine speed in idling operation.

According to the present invention, there is provided a system for controlling an electromagnetic clutch for an engine powered vehicle, which has an accelerator pedal, ignition device for said engine, magnetizing coil for coupling said electromagnetic clutch, comprising an acceleration detecting circuit responsive to the depression of said accelerator pedal for producing an output signal, a pulse generating circuit adapted to produce output pulses which vary in dependency on the engine speed, first gate means for passing said pulses to said magnetizing coil under the presence of said output signal from said acceleration detecting circuit, switch means provided in the circuit of said magnetizing coil and responsive to output of said gate means for allowing the current to pass through said magnetizing coil, idling speed detecting means for detecting the increase of the idling speed, a correcting circuit responsive to the output of said idling speed detecting means for producing a correcting output which is applied to said pulse generating circuit, said pulse generating circuit reduces output the pulse width of the pulses in response to said correcting output.

With the above and other objects and advantages in view, the present invention will become more clearly understood in connection with the detailed description of preferred embodiments, when considered with the accompanying drawings, of which:

DETAILED DESCRIPTION OF THE PREFERRED EMBODIMENTS

Figure 1:
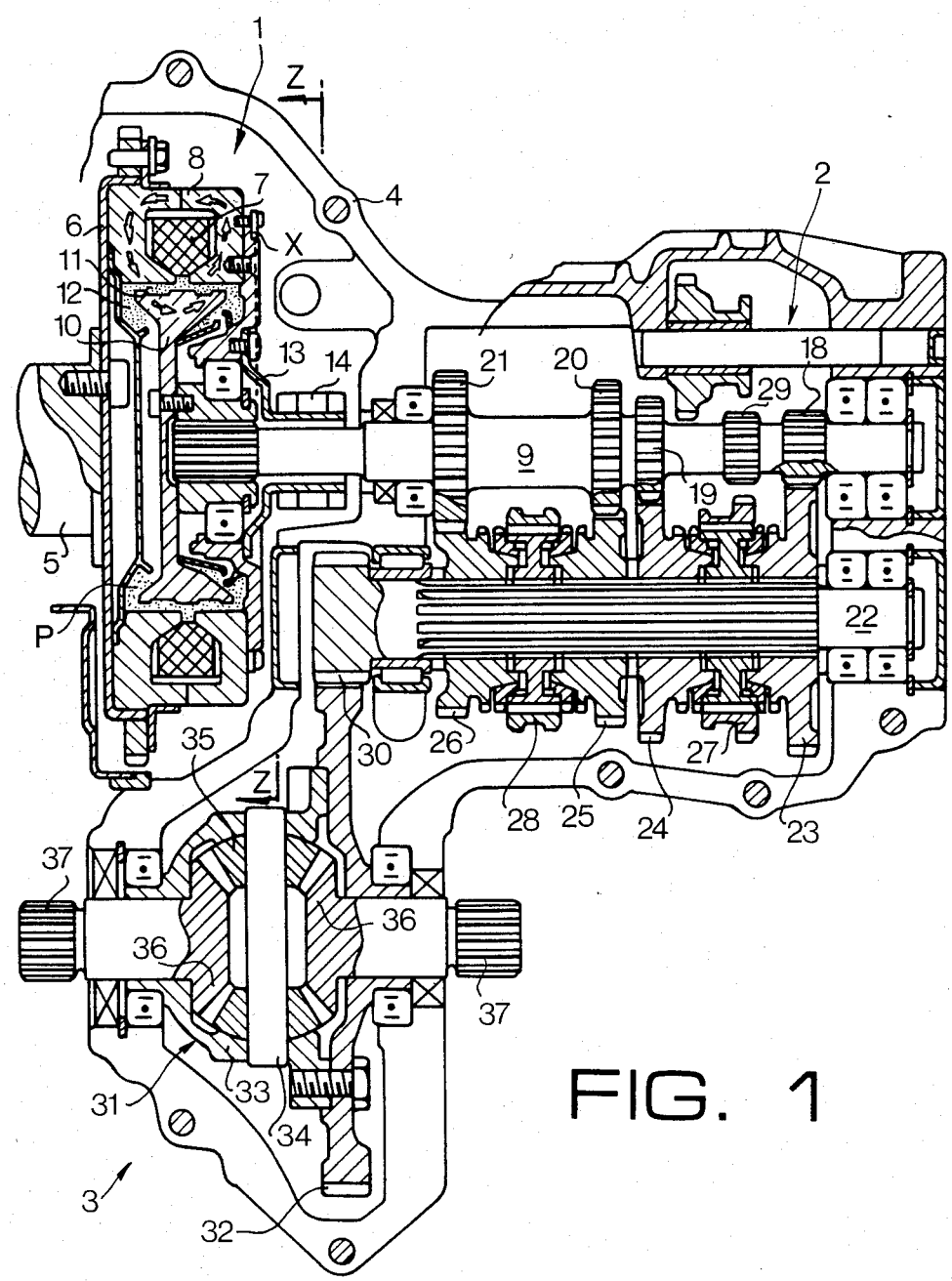
FIG. 1 is a cross-sectional view of an electromagnetic powder clutch used in a system according to the present invention.
Figure 2:
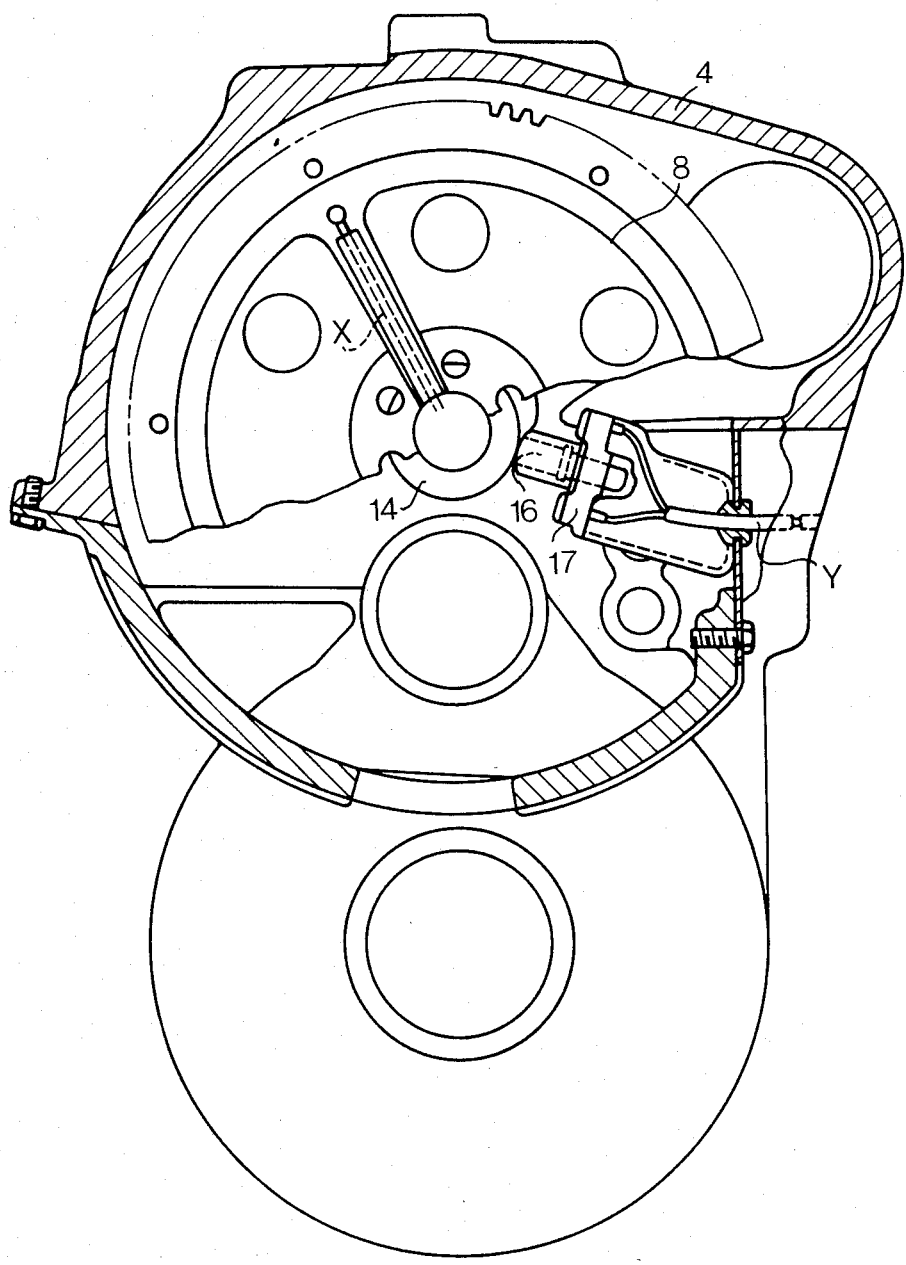
FIG. 2 is a cross-section taken along line Z—Z of FIG. 1.

Referring to FIGS. 1 and 2 showing a transmission to which the present invention is applied, an electromagnetic powder clutch, 1 is operatively connected to a four-speed transmission 2 which in turn is operatively connected to a final reduction device 3.

The electromagnetic powder clutch 1 provided in a clutch case 4 comprises a drive plate 6 secured to the end of a crankshaft 5 of an internal combustion engine, (not shown) an annular drive member 8 secured to the drive plate 6, a magnetizing coil 7 provided in the drive member 8, and a driven member 10 secured by a spline engagement to an input shaft 9 of the transmission 2, spaced leaving a gap 11 between the drive member 8 and the driven member 10. Magnetic powder is provided in a powder chamber 12 of which the gap 11 is a part. A cap 13 is secured to the drive member 8. The cap 13 has a cylindrical portion coaxial with the input shaft 9, to which slip rings 14 are secured. The slip rings 14 are connected to the drive member 8 by a lead X. The brushes 16 press against the slip rings 14 and are supported in a holder 17 and connected to a hereinafter described control means by a lead Y.

In such a construction, the drive plate 6 and the drive member 8 rotate together with the crankshaft 5 and the magnetic powder sealed in the powder chamber 12 is moved to the inner surface of the drive member 8 by centrifugal force. If the magnetizing coil 7 is excited by the current applied through the lead Y, the brushes 16, the slip rings 14 and the lead X, the drive member 8 is magnetized to produce a magnetic flux passing through the driven member 10. Thus, the powder is aggregated in the gap 11, so that the power of the engine is transmitted to the input shaft 9 through the clutch.

In the transmission 2, 1st to 4th speed drive gears 18 to 21 are jointly rotatably secured to the input shaft 9. The drive gears 18 to 21 are engaged with driven gears 23 to 26, respectively. The driven gears 23 to 26 are relatively rotatably mounted on the output shaft 22 the latter being parallel to the input shaft 9. Each of the driven gears 23 and 24 is jointly rotatably engageable with the output 9 shaft 22 by operating a synchromesh mechanism 27 and each of the driven gears 25 and 26 is engaged with the output shaft 22 by a synchromesh mechanism 28 in a well known manner. Further, a reverse drive gear means 29 is provided. Thus, by operating the shift lever (not shown) of the transmission, the driven gear 23 can be coupled selectively with the output shaft 22 by the synchromesh mechanism 27 and the 1st speed is obtained on the output shaft 22 and the speed of output shaft 9 is greatly decreased, and the 2nd, 3rd and 4th speed may be respectively obtained accordingly.

Further, provided on an end of the output shaft 22 is an output gear 30 which engages with a ring gear 32 in a differential 31 of the final reduction device 3 to transmit the output of the output shaft 22 of the transmission 2 directly from the ring gear 32 to side gears 36 through a case 33, a spider 34 and pinions 35, and further to vehicle driving wheels (not shown) through wheel shafts 37.

Figure 3:
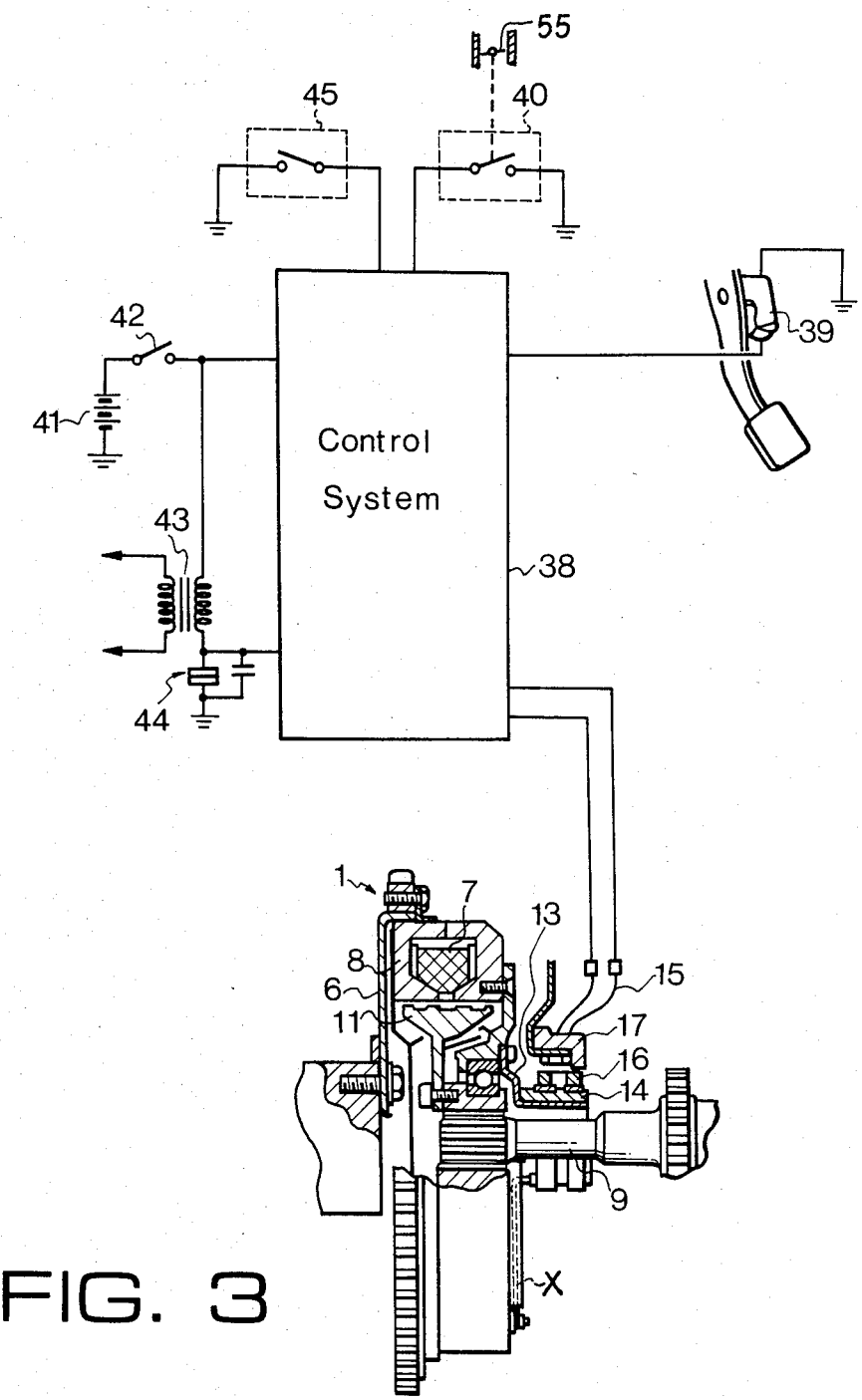
FIG. 3 is a schematic view showing an embodiment of the present invention.

Referring to FIG. 3, there is provided a control system 38 for controlling the clutch current, an acceleration switch 39 which is opened by depressing an accelerator pedal, a choke switch 40 for detecting closing of a choke valve 55 of a carburetor of the engine, and an air-conditioning switch 45 which is closed during operation of the air-conditioner (not shown). A voltage is supplied from a battery 41 to the control system 38 through a key switch 42.

A primary winding of an ignition coil 43 is connected to a contact-breaker 44 and to the control system 38 for supplying pulses caused by the ignition to the control system. The output of the control system 38 is connected to the magnetizing coil 7 of the clutch 1 through leads 15.

Figure 4:
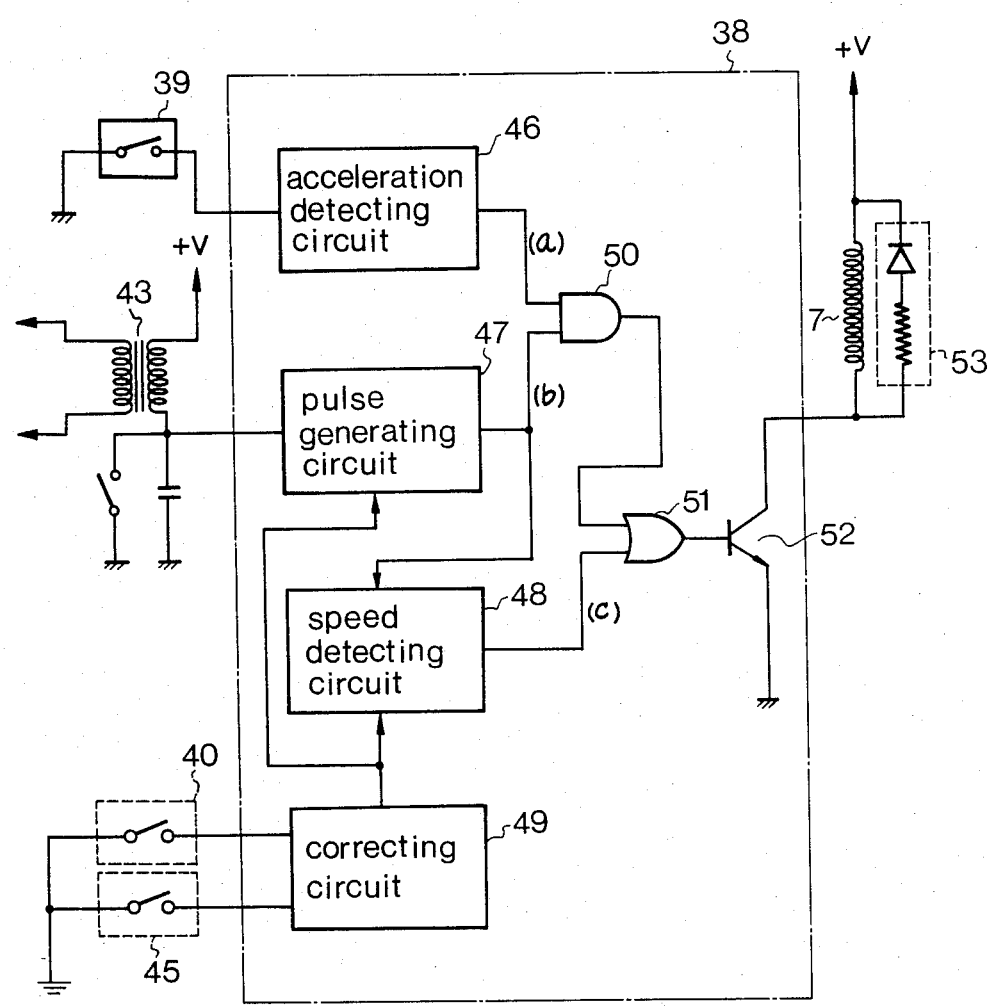
FIG. 4 is a schematic view showing a control circuit.
Figure 5:
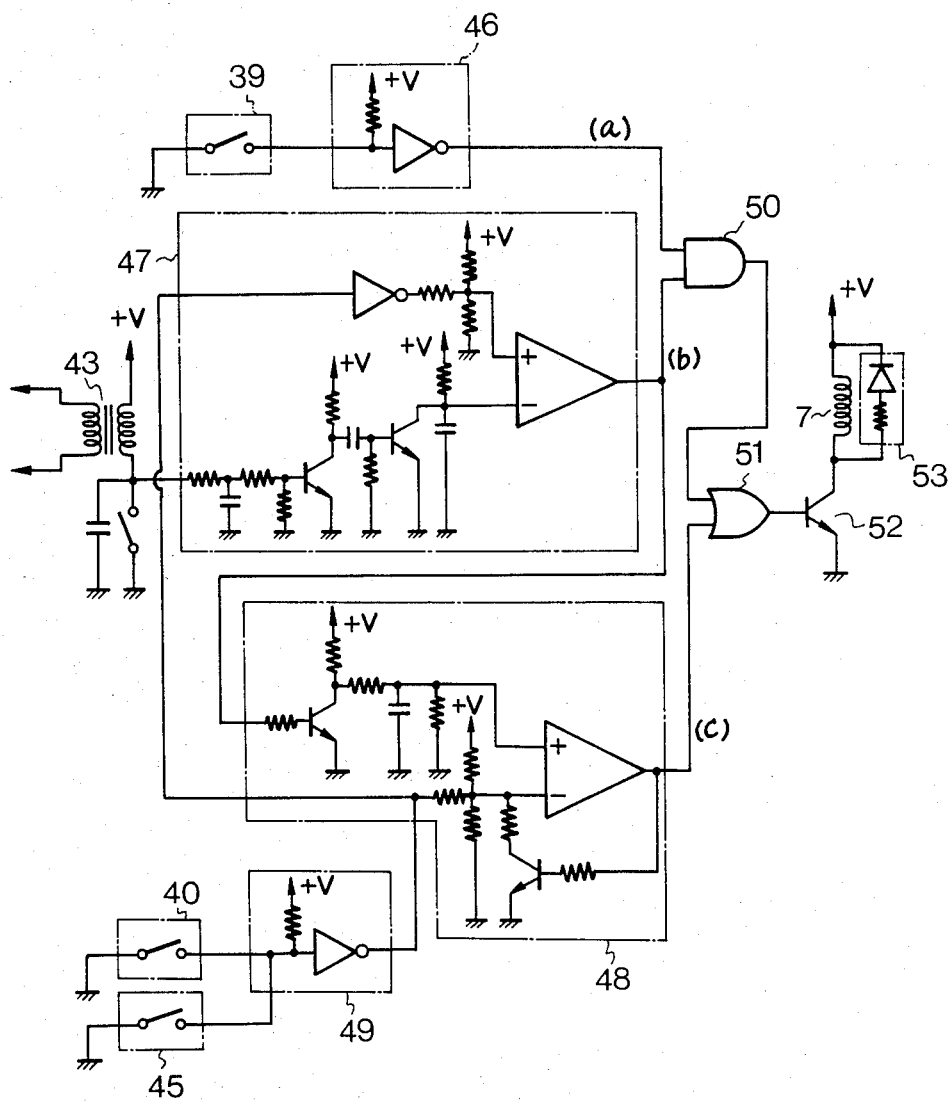
FIG. 5 is an electronic circuit of the control circuit.

Referring to FIGS. 4 and 5, the acceleration switch 39 is connected to an acceleration detecting circuit 46 in the control system 38, the ignition coil 43 is connected to a pulse generating circuit 47, and the choke switch 40 and the air conditioner switch 45 are connected to a correcting circuit 49. Outputs of the acceleration detecting circuit 46 and the pulse generating circuit 47 are applied to an AND gate 50. The output of the pulse generating circuit 47 is also applied to a speed detecting circuit 48. Outputs of the AND the gate 50 and speed detecting circuit 48 are applied to an OR gate 51, the output of which is applied to the base of a transistor 52. The corrector of the transistor 52 is connected to the magnetizing coil 7 of the clutch 1. A commutation circuit 53 comprising a diode and a resistor is connected to the coil 7 in parallel. The output of the correcting circuit 49 is connected to the pulse generating circuit 47 and to the speed detecting circuit 48.

Figure 6:
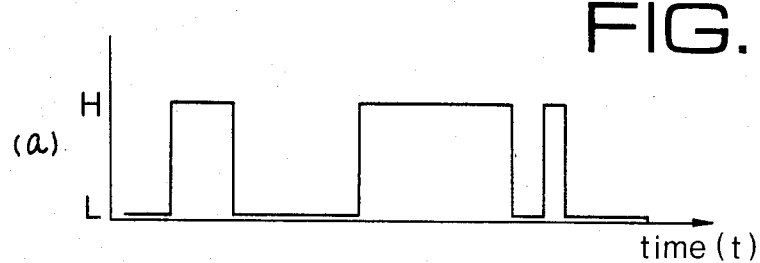
FIGS. 6 to 10 are output waveforms at various portions of the circuit of FIG. 5.

FIG. 6 shows output (a) of the acceleration detecting circuit 46. When the accelerator pedal is depressed, a high level output is produced during the acceleration of the engine.

Figure 7:
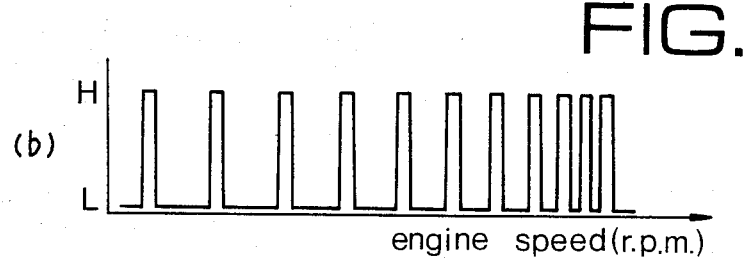

FIG. 7 shows output (b) of the pulse generating circuit 47. The pulse generating circuit comprises a differentiating circuit, a shaping circuit, a one-shot multivibrator and other circuitry, and produces one pulse at each ignition pulse of the ignition coil 43. The pulse by the pulses produced generating circuit 47 have a constant width but the pulse separation is inversely proportional to the engine speed. The pulse width however is changed when the choke valve 55 is closed or the air-conditioner is operated (cf. FIG. 10).

Figure 8:
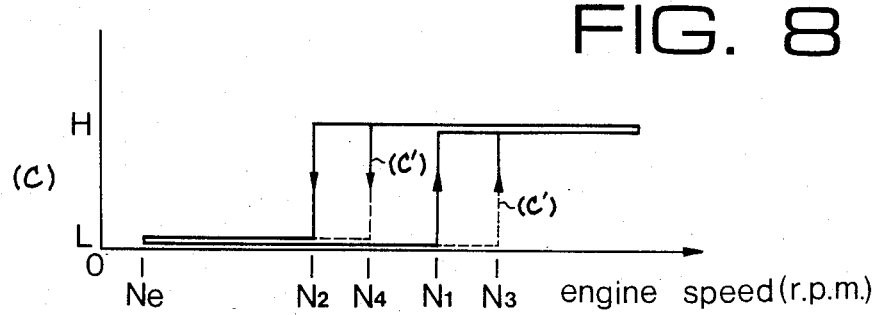

FIG. 8 shows the output (c) of the speed detecting circuit 48. When the engine speed reaches a predetermined reference speed $N_1$, the output of the circuit goes to a high level. When the engine speed decreases to a predetermined reference speed $N_2$, the output of the circuit 48 changes to a low level. That is, the engine speed for producing the high level output is higher than the engine speed for a correcting low level output. When the output of the correcting circuit 49 is applied to the speed detecting circuit 48, the reference speed $N_1$ changes to a higher reference speed $N_3$ and the reference speed a relatively higher speed $N_4$. $N_2$ changes to a relatively higher speed $N_4$.

Figure 10:
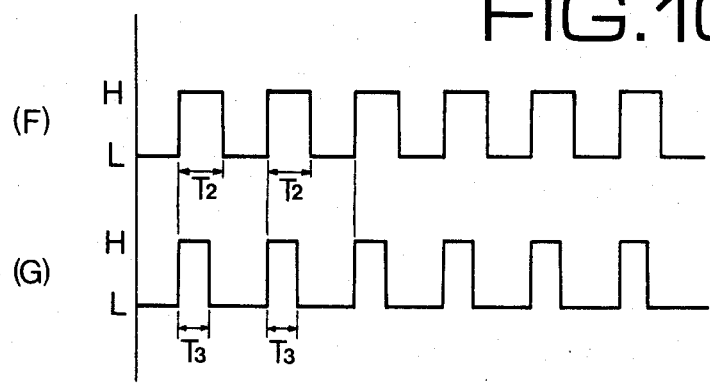
Figure 11:
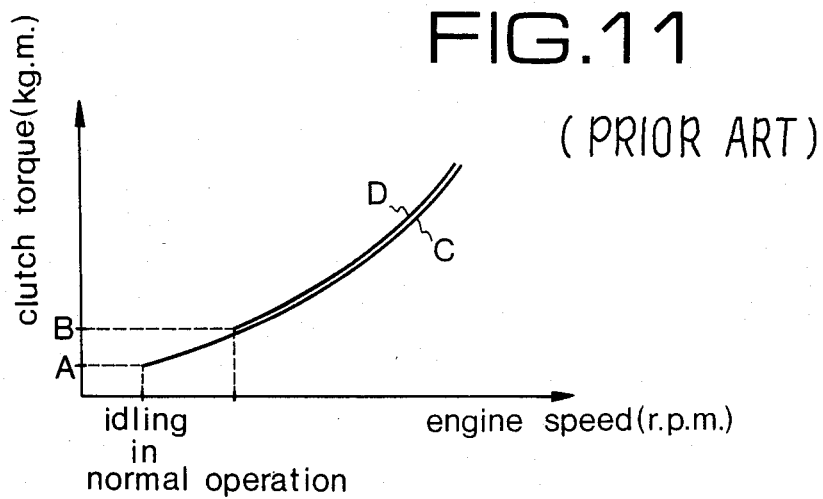
FIG. 11 is a graph illustrating the relationship of the clutch torque and the engine speed of a conventional system.

FIG. 10 shows pulses from the pulse generating circuit 47 at idling operations. FIG. 10(F) shows pulses during a normal idling operation and FIG. 10(G) shows pulses in an idling condition when the choke valve 55 is closed or the air conditioner is operated, that is when the correcting output of the correcting circuit 49 is applied to the pulse generating circuit 47. The time scale is different in (F) and (G) in FIG. 10 to facilitate the difference in pulse widths. The pulse width is reduced from the pulse width $T_2$ (F) to $T_3$ (G) by the correcting signal from the circuit 49.

Figure 9:
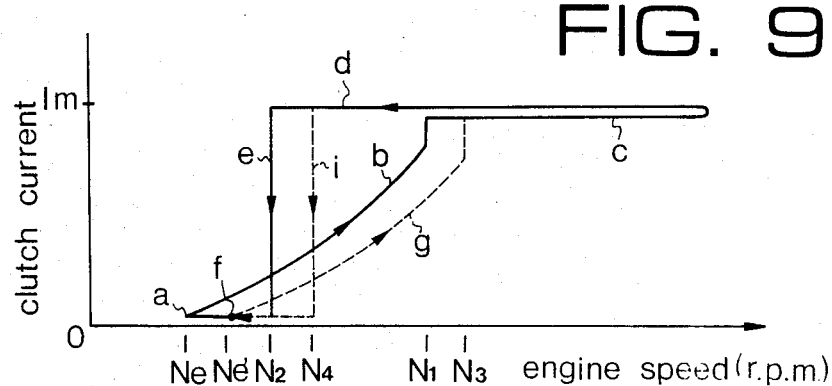

When the accelerator pedal is depressed during normal idling operation, the acceleration detecting circuit 46 produces a high level output which is applied to the AND gate 50. Therefore, the output of the AND gate 50 which is similar to the output pulses of the pulse generating circuit 47 is applied to the transistor 52 through the OR gate 51. Thus, clutch current passes through the coil 7 as shown by a-b in FIG. 9, and hence the clutch gradually engages and is held in partial engagement for smoothly starting the vehicle. When the engine speed reaches $N_1$, the output of the speed detecting circuit 48 goes to a high level which is applied to the transistor 52 through the OR gate 51. Thus, the rated current Im passes through the coil 7, so that the clutch is completely engaged. If the engine speed increases above $N_1$ and/or decreases lower than $N_1$ but not to $N_2$, the rated current continues to flow through coil and hence the clutch is kept completely engaged.

When the engine speed reaches $N_2$, the output of the speed detecting circuit 48 goes to a low level. If the accelerator pedal is released, the output of the AND gate 50 is at a low level. Therefore, the transistor 52 is turned off and the clutch is disengaged. During such an operation, the clutch current varies as shown a→b→c→d→e in FIG. 9.

When the choke valve 55 is closed or the air conditioner is operated, the engine speed in the idling operation is increased from Ne to $N_e'$ by operation of a conventional device provided in the carburetor of the engine of usual vehicles. Since the choke switch 40 or the air conditioner switch 45 is closed, the correcting circuit 49 produces a correcting output which is applied to the pulse generating circuit 47 and to the speed detecting circuit 48. Therefore, the speed detecting circuit 48 produces the rightwardly shifted output (C') (FIG. 8) $N_e'-N_3-N_4$ and the width of the pulse generated from the pulse generating circuit 47 is reduced as shown in FIG. 10(G). Since the clutch current is decreased by the smaller pulse width, the clutch current increases starting from point f corresponding to the idling speed $N_e'$ in FIG. 9. When the speed reaches $N_3$, the rated current Im passes through the coil 7 to completely engage the clutch. When the engine speed decreases to $N_4$, the clutch current decreases as described in the preceding paragraph. Thus, the clutch current varies as f→g→c→d→i.

Figure 12:
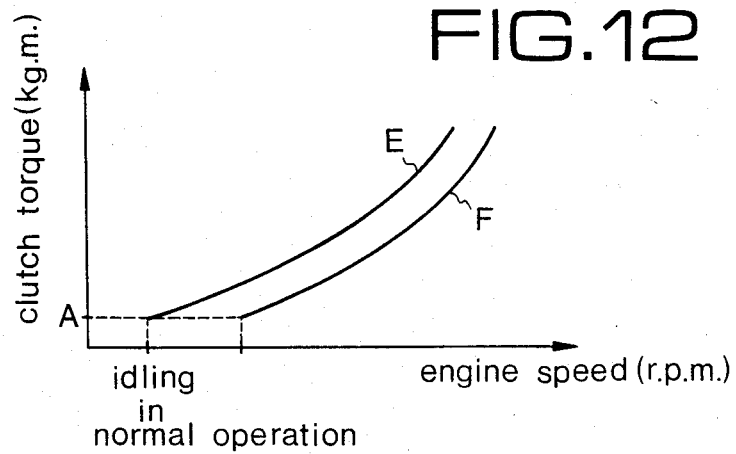
FIG. 12 is a graph illustrating the relationship of the clutch torque and the engine speed of the present invention.

FIG. 12 shows variations of the clutch torque of the system of the present invention. Curve E shows the variation during the normal engine operation and F shows the variation when the choke is operated or the air-conditioner is operated which corresponds to the current curve f→g in FIG. 9. Thus, the vehicle can smoothly start in spite of a high idling speed.

Although the above described system uses the choke switch and air conditioner switch for detecting the high idling speed, another detecting means such as idling speed sensor which detects the speed when the vehicle is not moving may be used.

From the foregoing, it will be understood that the clutch torque is the same upon depressing the accelerator pedal even if the idling speed has increased, so that the vehicle may smoothly start and may be driven at a very low speed.

What is claimed is:
1. A system for controlling an electromagnetic clutch for an engine powered vehicle which has an accelerator pedal, a choke valve, an ignition device for said engine, and a circuit containing a magnetizing coil for coupling said electromagnetic clutch, comprising
an acceleration detecting circuit responsive to the depression of said accelerator pedal for producing an output signal,
a pulse generating circuit responsive to said engine ignition device for producing output pulses having a pulse separation which varies in dependency on the engine speed,
first gate means for operatively passing said pulses during occurrence of said output signal from said acceleration detecting circuit,
switch means provided in the circuit of said magnetizing coil and responsive to the output of said gate means for sending current through said magnetizing coil depending on the output of said gate means,
means comprising a choke switch for being closed when said choke valve is closed,
a correcting circuit responsive to the output of said choke switch for producing a correcting output which is applied to said pulse generating circuit,
said pulse generating circuit means for reducing the pulse width of each of said output pulses in response to said correcting output.
2. The system for controlling an electromagnetic clutch for an engine powered vehicle in accordance with claim 1 wherein
said switch means is a transistor, which is turned on by said output of said gate means.
3. The system for controlling an electromagnetic clutch for an engine powered vehicle in accordance with claim 2 further comprising
an engine speed detecting circuit means for producing an output when the engine speed exceeds a predetermined value, and
a second gate means applied with the output of said first gate means and said output of said engine speed detecting circuit means for producing an output for said transistor,
said engine speed detecting circuit means for varying the level of said output thereof via said correcting output.
4. The system for controlling an electromagnetic clutch for an engine powered vehicle in accordance with claim 2 wherein
said first gate means comprises an AND gate responsive to outputs of said acceleration detecting circuit and of said pulse generating circuit means and
said second gate means comprises an OR gate responsive to the output of said AND gate and to the output of said engine speed detecting circuit for producing an output for turning on said transistor.
5. The system for controlling an electromagnetic clutch for an engine powered vehicle in accordance with claim 4 wherein
said engine speed detecting circuit produces a high level output at a first predetermined engine speed in an accelerating condition and a low level output at a second predetermined engine speed lower than said first predetermined engine speed in a decelerating condition.

6. A system for controlling an electromagnetic clutch having a magnetizing coil for engaging said electromagnetic clutch in an engine powered vehicle, comprising
first detecting means for detecting engine speed,
pulse generating means having an output, responsive to said detecting means, for producing pulses at said output having a first variable parameter which varies in dependency on the engine speed and a second variable parameter,
switch means operatively connected to said magnetizing coil and to said output of said pulse generating means, being responsive to said first and second variable parameters for sending current through said magnetizing coil, as a function of said variable parameters,
said vehicle having selectively operable means for increasing the idling speed of the engine from a first idle speed to a second idle speed,
second detecting means for detecting the operation of said selectively operable means for producing a correcting output when said selectively operable means is operating,
said pulse generating means in cooperation with said second detecting means changes said second variable parameter in response to said correcting output such that said current has substantially the same initial value at both said first and said second idling speeds,
one of said variable parameters is pulse repetition frequency and the other of said variable parameters is pulse width,
said selectively operable means includes an air-conditioner.

7. A system for controlling an electromagnetic clutch having a magnetizing coil for engaging said electromagnetic clutch in an engine powered vehicle, comprising
first detecting means for detecting engine speed,
pulse generating means having an output, responsive to said detecting means, for producing pulses at said output having a first variable parameter which varies in dependency on the engine speed and a second variable parameter,
switch means operatively connected to said magnetizing coil and to said output of said pulse generating means, being responsive to said first and second variable parameters for sending current through said magnetizing coil, as a function of said variable parameters,
said vehicle having selectively operable means for increasing the idling speed of the engine from a first idle speed to a second idle speed,
second detecting means for detecting the operation of said selectively operable means for producing a correcting output when said selectively operable means is operating,
said pulse generating means in cooperation with said second detecting means changes said second variable parameter in response to said correcting output such that said current has substantially the same initial value at both said first and said second idling speeds,
an accelerator pedal of the vehicle,
gate means for connecting said output of said pulse generating means to said switch means when said accelerator pedal is depressed.

* * * * *